United States Patent [19]

Ohlson

[11] 4,278,284
[45] Jul. 14, 1981

[54] ARRANGEMENT FOR SUSPENDING A PIVOTED SIDE-BOARD

[76] Inventor: Kjell F. Ohlson, Tallmovägen 2B, 752 45 Uppsala, Sweden

[21] Appl. No.: 58,559

[22] Filed: Jul. 18, 1979

[51] Int. Cl.³ .............................................. B62D 27/00
[52] U.S. Cl. .................................. 296/36; 296/57 R; 296/183
[58] Field of Search ...................... 296/36, 57, 58, 59, 296/60; 16/171, 172, 174–177

[56] References Cited

U.S. PATENT DOCUMENTS

| | | | |
|---|---|---|---|
| 1,255,290 | 2/1918 | Bryant | 296/57 R |
| 2,495,678 | 1/1950 | Bellinghausen | 296/36 |
| 3,651,537 | 3/1972 | Nichols | 16/172 |

Primary Examiner—Robert R. Song
Attorney, Agent, or Firm—Witherspoon & Hargest

[57] ABSTRACT

Sideboard suspension arrangement for a vehicle for suspending a sideboard from a platform such that the sideboard may be pivoted to a raised or lowered position relative to the platform and such that the sideboard may be attached to or removed from the platform by an individual without assistance. The sideboard and platform include affixation means for providing a swinging pivot at one end of the platform and sideboard which allows the other end of the sideboard to be pivoted away from the other end of the platform during attachment and removal of the sideboard.

5 Claims, 3 Drawing Figures

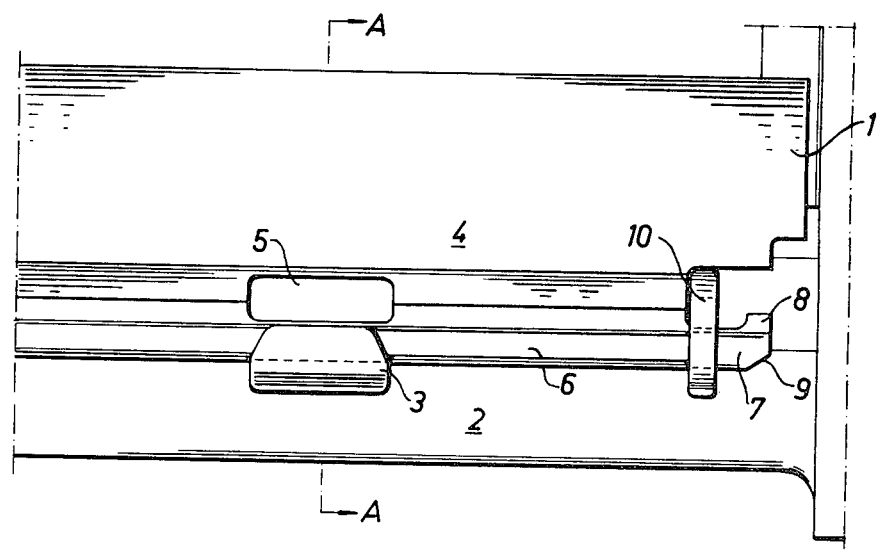
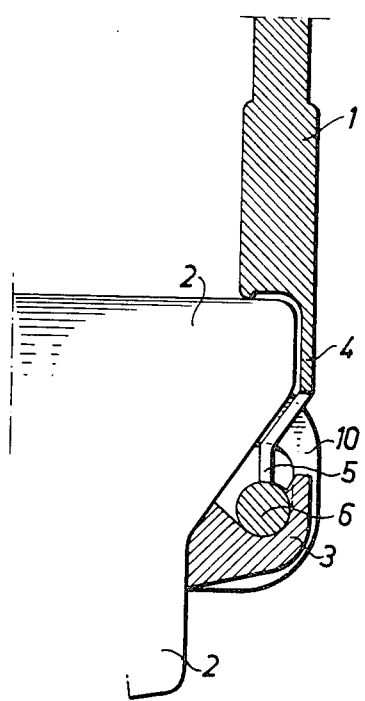
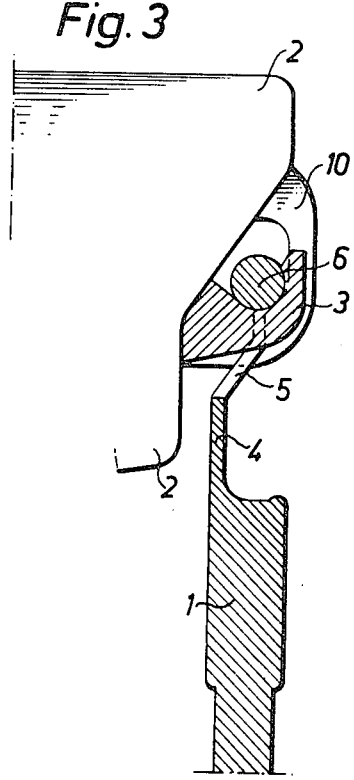

ARRANGEMENT FOR SUSPENDING A PIVOTED SIDE-BOARD

Generally the invention relates to means for suspending a pivoted side-board, the invention having particular reference to suspending means of this type which on the one hand guarantee that the side-board is securely held both in the swung-down and the closed position and which on the other hand enable a single person to detach the whole side-board from its mounted position and also to remount the side-board again from the completely detached position.

Various types of suspending arrangements for pivoted side-boards, such as the lateral and rear side-boards of lorries and trailers, have been used before. Such arrangements comprise hinges as well as different types of hooks coacting with receiving sleeves. A common disadvantage of these known devices resides in that always two attendants had to cooperate when the side-board was to be removed and replaced because the pivotable side-boards in many cases are relatively long and heavy and simultaneous disengagement and engagement, respectively, was necessary for all the known suspending arrangements for side-boards. Particularly great difficulties were offered by the inserting operation because in connection therewith the side-board had initially to be lifted and adjusted into an exactly correct position to be subsequently moved in its longitudinal direction to cause the hooks or the like to enter into the receiving sleeves. It will be appreciated that in particular during darkness and in bad weather the measures as described above have been difficult to perform quickly and correctly even if two attendants participated.

The present invention has the purpose to eliminate the above draw-backs encountered in previous types of suspending devices for pivoted side-boards, this purpose being achieved in a device according to the preamble of the attached main claim by means of the characteristic features as expressed in the attached claims.

In the attached drawing

FIG. 1 is a side elevation of the right-hand end portion of a pivoted side-board in its closed position having a suspending arrangement according to the present invention, FIG. 2 is a sectional view as seen in the plane A—A in FIG. 1, and FIG. 3 is a corresponding sectional view as in FIG. 2 with the side-board in its swung-down position.

FIGS. 1 and 2 show how a side-board 1 in its raised position and having the presently preferred construction at its lower portion is supported in holder sockets 3 a number of which are attached in mutually spaced distribution along the length of a platform edge profile beam 2. The lower edge 4 of the side-board 1 has reduced thickness in comparison with the portion disposed above the platform edge profile beam and merges into a inwardly bent portion down to a lower rod 6 which is supported by holding sockets 3 as specifically shown in FIG. 2.

In the inwardly bent portion between portion 4 of the side-board and rod 6 recesses 5 are provided in which holding sockets 3 will be disposed when the side-board is in its downwardly swung position as shown in FIG. 3. As appears from the drawing side-board 1 then is in a position within the outer contour line of platform edge profile beam 2 when outer edge portion of the side-board 1 has the shape illustrated at the right-hand portion of FIG. 1. The bent portion is there provided with a recess shaped so that rod 6 and the bent portion form a protrusion 7 having a shoulder 8 which in the raised position of the side-board extends upwardly. The lower surface is bevelled as at 9 for reasons explained later. On the platform edge profile beam 2 an eye or loop 10 is provided which may be welded or otherwise attached to the platform edge profile beam 2.

The eye or loop 10 is not intended to support any part of the side-board in the position of use but has a different function. When the side-board is to be detached the first thing to do will obviously be to open the latches to enable the side-board to be swung down from the position of use shown in FIG. 2. Thereafter the side-board 1 may be lifted at its left-hand side as seen in FIG. 1 out of holding sockets 3 and may be swung slightly outwardly from the platform edge profile beam 2 to be lowered to the ground, the protrusion 7 at the right-hand end of the side-board then being retained in and supported by the eye or loop 10 which in this connection serves as a swinging pivot retaining the right-hand end of the side-board in its position at the platform edge profile beam 2. Subsequently the attendant slightly moves the side-board to the left in FIG. 1 using recesses 5 as a handle to cause protrusion 7 to pass past the eye or loop 10 to enable the right-hand end of a side-board 1 as seen in FIG. 1 to be lowered to the ground.

When the side-board 1 is again to be mounted on the vehicle its right-hand portion as seen in FIG. 1 is lifted and protrusion 7 is inserted into the eye or loop 10 with the shoulder 8 turned downwardly. To facilitate the insertion the end surface is bevelled at 9 as shown in FIG. 1. Subsequently side-board 1 is shifted to the right in FIG. 1 to cause shoulder 8 to fix the position of the right-hand end of the side-board 1 by cooperation with eye or loop 10. Subsequently the attendant will be able to lift the left-hand end of side-board 1 as seen in FIG. 1 and in a simple way insert the side-board into holding sockets 3. The right-hand end of the lower side-board edge 4, as shown in FIG. 1, will by its contact with the eye or loop 10 bring about a lateral adjustment of the whole side-board correctly positioning recesses 5 of the side-board edge in relation to the holding sockets 3.

It will be appreciated that the present invention provides a holding device for side-boards enabling mounting and detachment of the side-board to be simply performed by a single attendant without the necessity to lift the heavy side-board as a whole or exactly to position hooks in relation to mounting sleeves as in previous constructions.

It will also be appreciated that the presently preferred construction as described above by reference to the drawing only examplifies the invention and that modifications and variations may be made within the basic idea underlying the invention as expressed in the attached claims. For example, the outwardly protruding protrusion 7 on the lower portion of the side-board may be replaced by a ball coacting with a ball holder attached to the platform edge profile beam 2 in such a way that a function identical to that of the preferred embodiment as described above is obtained in connection with mounting and detaching the side-board. Obviously protrusion 7 can also be provided with the ball holder whereas the platform edge profile beam carries the ball. In certain cases recesses 5 of the side-board 1 can be dispensed-with and the holding sockets 3 may be given any suitable shape.

What is claimed is:

1. A side-board suspension arrangement for a vehicle comprising a platform having a first end, a second end and an attachment portion including at least one upwardly-outwardly open hook, a side-board having corresponding first and second ends and an attachment portion including at least one attachment member which is removeably coupled to said upwardly-outwardly open hook such that said side-board may be removeably coupled to said platform and may be pivoted to raised and lowered positions relative to said platform, first affixation means positioned at said first end of said platform, and second affixation means positioned at said first end of said side-board and removeably coupled to said first affixation means, for providing a swinging pivot which retains said first end of said side-board at said first end of said platform while said second end of said side-board is pivoted away from said second end of said platform during attachment and removal of said side-board relative to said platform.

2. A sideboard suspension arrangement for a vehicle according to claim 1 wherein said first affixation means includes a loop-like member extending from said first end of said platform, and said second affixation means includes a freely extending portion protruding from said sideboard, and wherein said freely extending portion extends into said loop-like member to provide said swinging pivot.

3. A sideboard suspension arrangement for a vehicle according to claim 2 wherein said freely extending portion is curved or bent to form a hook which protrudes from said sideboard.

4. A sideboard suspension arrangement for a vehicle according to claim 3 wherein said curved or bent portion comprises a bevelled surface.

5. A side-board suspension arrangement for a vehicle comprising a platform having a first end, a second end and an attachment portion including a plurity of upwardly and outwardly open hooks extending from said platform attachment portion, a side-board having corresponding first and second ends and an attachment portion including a rod which extends between said first end and said second end of said side-board and is attached to said side-board attachment portion, said rod being removeably supported by said hooks such that said side-board may be removeably coupled to said platform and may be pivoted to raised and lowered positions relative to said platform, a loop-like member extending from said first end of said platform, and a freely extending portion, including said rod, extending from said side-board, and wherein said freely extending portion removeably extends into said loop-like member, for providing a swinging pivot which retains said first end of said side-board at said first end of said platform while said second end of said side-board is pivoted away from said second end of said platform during attachment and removal of said side-board relative to said platform.

* * * * *